Oct. 23, 1962 G. S. VAN DEUSEN Re. 25,267

BALLING APPARATUS FOR SLIVERS

Original Filed April 28, 1960 5 Sheets-Sheet 1

INVENTOR.
GEORGE S. VAN DEUSEN
BY Hudson, Boughton, Williams, David & Hoffmann
ATTORNEYS

BALLING APPARATUS FOR SLIVERS

Original Filed April 28, 1960 5 Sheets-Sheet 2

INVENTOR.
GEORGE S. VAN DEUSEN
BY Hudson, Boughton, Williams, David & Hoffmann
ATTORNEYS

BALLING APPARATUS FOR SLIVERS

Original Filed April 28, 1960 5 Sheets-Sheet 3

INVENTOR.
GEORGE S. VAN DEUSEN
BY Hudson, Boughton, Williams, David & Hoffmann
ATTORNEYS

BALLING APPARATUS FOR SLIVERS

Original Filed April 28, 1960 5 Sheets-Sheet 4

INVENTOR.
GEORGE S. VAN DEUSEN
BY Hudson, Boughton, Williams, Davidt Hoffmann
ATTORNEYS BALLING APPARATUS FOR SLIVERS
Original Filed April 28, 1960 5 Sheets-Sheet 5
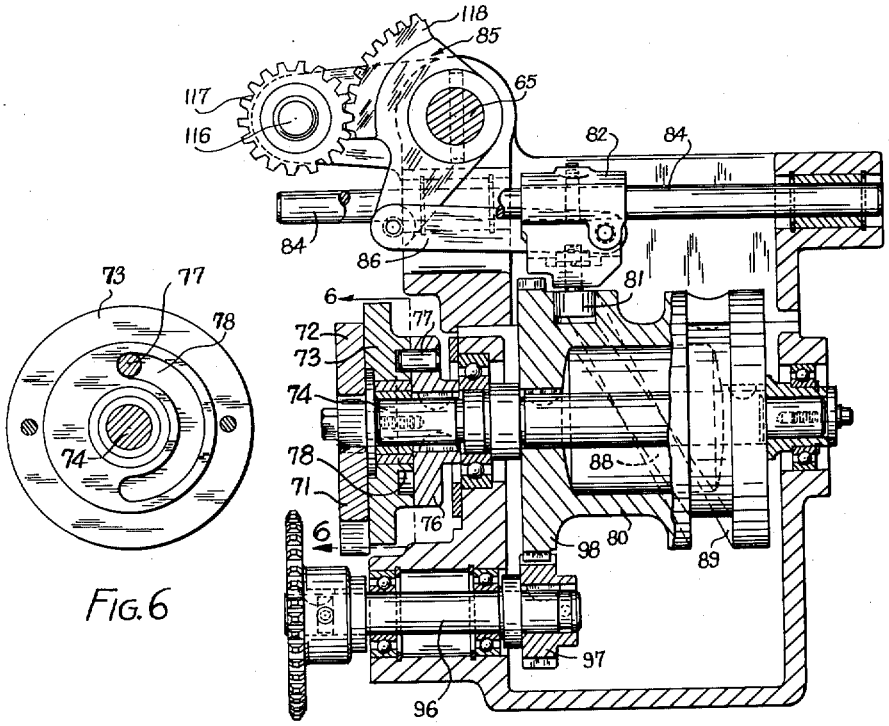
FIG. 6
FIG. 5
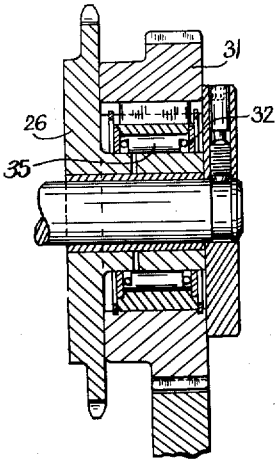
FIG. 8
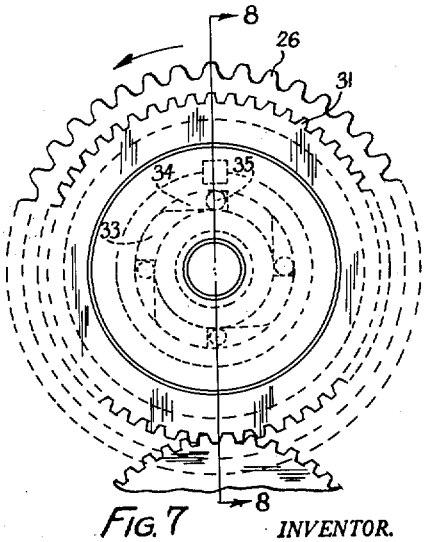
FIG. 7
INVENTOR.
GEORGE S. VAN DEUSEN
BY Hudson, Boughton, Williams, David & Hoffmann
ATTORNEYS United States Patent Office Re. 25,267
Reissued Oct. 23, 1962

25,267
BALLING APPARATUS FOR SLIVERS

George S. Van Deusen, Willoughby, Ohio, assignor to The Warner & Swasey Company, Cleveland, Ohio, a corporation of Ohio Original No. 3,019,996, dated Feb. 6, 1962, Ser. No. 25,399, Apr. 28, 1960. Application for reissue Apr. 19, 1962, Ser. No. 190,194
29 Claims. (Cl. 242—54.4)

Matter enclosed in heavy brackets [ ] appears in the original patent but forms no part of this reissue specification; matter printed in italics indicates the additions made by reissue.

The present invention relates to a balling apparatus for slivers and, more particularly, to such an apparatus which automatically doffs the formed ball and initiates the forming of a new ball.

In one type of balling apparatus to which the present invention relates, a sliver is wound on an arbor which is comprised of a pair of axially aligned half arbors positioned in end-to-end relationship and which are separated when the ball thereon is to be doffed. The arbor is positioned adjacent a driving drum and the sliver to be wound into a ball passes between the drum and the arbor. The drum is rotated and effects rotation of the abor through the sliver and the ball of sliver wound on the arbor in a manner well understood by those skilled in the art. The sliver is guided on to the arbor by a guide member which receives the sliver from a delivery mechanism, such as a gill box, and is reciprocated along the length of the arbor to wind the sliver into a uniform ball on the arbor.

One aspect of the present invention relates to a balling apparatus utilizing half arbors which grip the sliver preparatory to winding the sliver into a ball by closing onto the sliver which is disposed between the ends of the half arbors. Then as the arbor is rotated by the driving drum, the sliver winds onto the arbor. When the formed ball is to be doffed, the arbor is moved to a doff position, the half arbors opened, and the ball dropped into a delivery chute. The arbors are then closed onto the sliver which is now extending between the guide member and the doffed ball, to grip the sliver and the arbors positioned preferably simultaneously with the closing of the arbors adjacent the drum to be rotated thereby. The rotation of the arbor to start a new ball stretches the sliver and breaks it from the previously formed ball to disconnect the ball and sliver.

An important object of the present invention is to provide a new and an improved balling apparatus having simplified and novel structure for supporting the arbors for movement as the ball is formed thereon to accommodate the increasing ball size and for supporting and actuating the arbor to a ball-doff position.

Another object of the present invention is to provide a new and an improved balling apparatus having half arbors upon which the ball is wound and which are opened to doff the ball and closed to regrip the sliver preparatory to forming a new ball and wherein the arbors are moved to a doff position and opened in sequence when a formed ball is to be doffed and then simultaneously moved into balling position for forming a new ball and closed to grip the sliver.

Still another object of the present invention is to provide a new and an improved balling apparatus which can be adjusted to form and doff different size balls without requiring the mechanical adjustment of operating parts of the apparatus.

A still further object of the present invention is to provide a new and an improved balling apparatus in which arms supporting the half arbors upon which the sliver is being wound are supported for free pivotal movement about a first axis to accommodate the increasing size of the ball and for rocking movement about a second axis parallel to the first axis to move the arms and arbors to and from a ball-doffing position.

A further object of the present invention is to provide a new and an improved balling apparatus in which arbor means upon which a sliver is being balled is moved to a ball doffing position when the ball is formed thereon and a drum for receiving the formed ball is rotated to a ball-receiving position when the arbor means is moved to a doffing position and to a ball-delivery position when the arbor means is returned to a balling position.

A still further object of the present invention is to provide a new and an improved balling apparatus in which half arbors upon which a sliver is balled are supported for opening and closing movements to release a formed ball and to grip a sliver for forming a new ball, respectively, and for movement between a balling position and a doffing position, and wherein a drive effects the movement of the arbor to a doff position and the opening of the half arbors in sequence and a return of the arbors to a balling position simultaneously with the closing of the arbors.

A further object of the present invention is to provide a new and an improved balling apparatus as in the next preceding object wherein a drum is automatically rotated to a ball-receiving position when the arbor is moved to a doff position, and to a ball-delivery position when the arbor is returned from its doff position to a balling position.

The present invention further contemplates the provision of a balling apparatus in which a sliver is guided onto an arbor comprised of half arbors by a guide member reciprocated along the length of the arbor and wherein the half arbors are moved apart to doff a completed ball and into engagement with each other to grip the sliver preparatory to forming a new ball and to break the connection of the sliver to the ball which has just been doffed, the apparatus being so constructed and arranged that the guide member is automatically returned to a position opposite the point of gripping of the sliver by the arbor each time a ball is doffed and prior to the gripping of the sliver to start a new ball on the arbor.

In the preferred and illustrated embodiment of the present invention, the apparatus comprises an arbor preferably formed by a pair of half arbors which are mounted at the outer ends of support arms, the support arms being pivoted to support members so as to be capable of movement about a first axis to accommodate the building up of the ball on the arbor and the support members being mounted for oscillation between a balling position and a ball-doff position and for movement toward and from each other to position the ends of the half arbors in engagement with each other to grip a sliver to be wound into a ball and to separate the arbors to doff a formed ball. The support members are oscillated in one direction from a balling position to a ball-doff position by a reversible motor which is connected through a cam to actuate the support members to their ball-doff position when the motor is rotated in one direction and then to provide a dwell in the movement of the support members while the motor continues to rotate in the one direction to effect the opening of the arbors. The motor is then reversed to rotate the cam in the other direction with the cam being rotated through its dwell period to allow the doffed ball to move from between the half arbors, and after the dwell period the cam operates to move the support members to their balling position and simultaneously the drive from the motor effects the closing of the arms to move the half arbors into engagement with each other and grip the sliver. The drive to open and close the arbors is, in the preferred embodiment, from a shaft which mounts the cam for moving the arbor support arms between their balling and doff positions to a drive member actuatable to open and close the arbors, the drive member being driven from the cam through a lost motion connection which provides a dwell each time the direction of drive is reversed. In the preferred embodiment, the sliver is guided onto the arbor by a guide member which is reciprocated along the arbor to guide the sliver onto the arbor. The guide member is driven from the gill box which supplies the sliver and when the ball is to be doffed, the gill box is stopped. The guide member might be in any position along the length of the arbor when it is stopped and a sensing mechanism is provided for sensing when the guide member is displaced from a predetermined position and for connecting a drive to move the guide member until it reaches the predetermined position. At this time, the drive to the guide member is disconnected. In the preferred and illustrated embodiment, the sensing means includes a control member which is rotated in timed relation to the reciprocation of the guide member and which has a unique position corresponding to the center position of the guide member. If the control member is disposed in any position except the position corresponding to the center position of the guide member when the cycle of the machine is reached where the guide member is to be centered, a circuit is completed to connect the motor for opening and closing the arbor to the drive for reciprocating the guide member and the latter is moved until the control member is in a position corresponding to the center position for the guide member, at which time the drive is disconnected. The drive from the gill box to the guide member preferably includes an overrunning clutch which allows the guide member to be positioned by the motor without actively disengaging the drive from the gill box to the guide member.

The doffed ball, in the preferred and illustrated embodiment, drops into a chute and rolls into a drum which is moved into position to receive the ball by the same cam which moves the arbors to their doff position. The cam also effects the rotation of the drum to a delivery position where the ball is to be taken from the drum when the cam is rotated to move the arms from their doff position to a balling position. Preferably, the automatic doffing of a ball is initiated in response to a yardage counter which measures the yardage of sliver traveling from the gill box to the arbor.

The preferred embodiment of the present invention is described in detail hereinafter with respect to the accompanying drawings forming a part of the present specification and in which.

Figure 1:
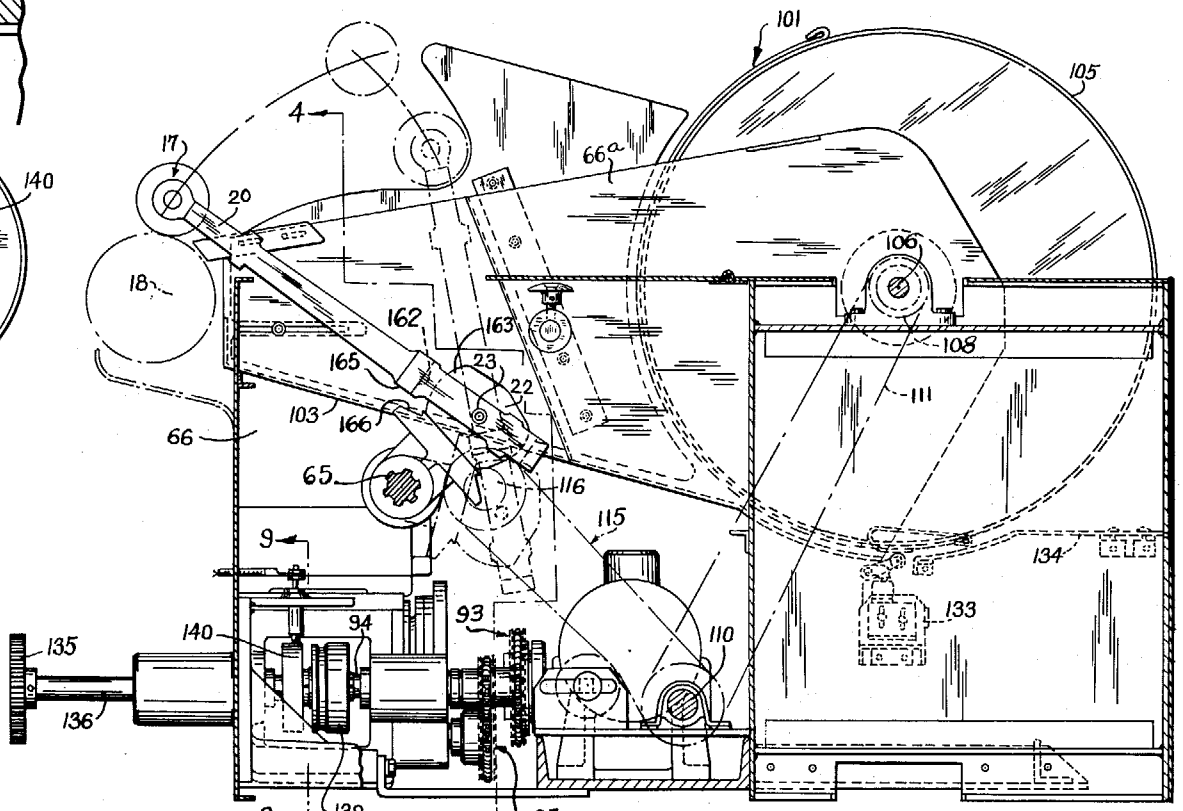
FIG. 1 is a side elevational view taken of a balling apparatus embodying the present invention with the side cover removed and parts cut away and showing that part of the apparatus which includes the arbor upon which the ball is formed, the operating mechanism therefor, and a drum for receiving the formed ball.
Figure 9:
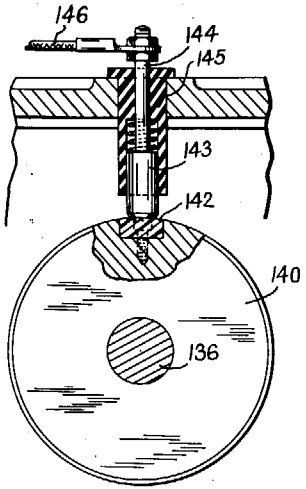
Figure 2:
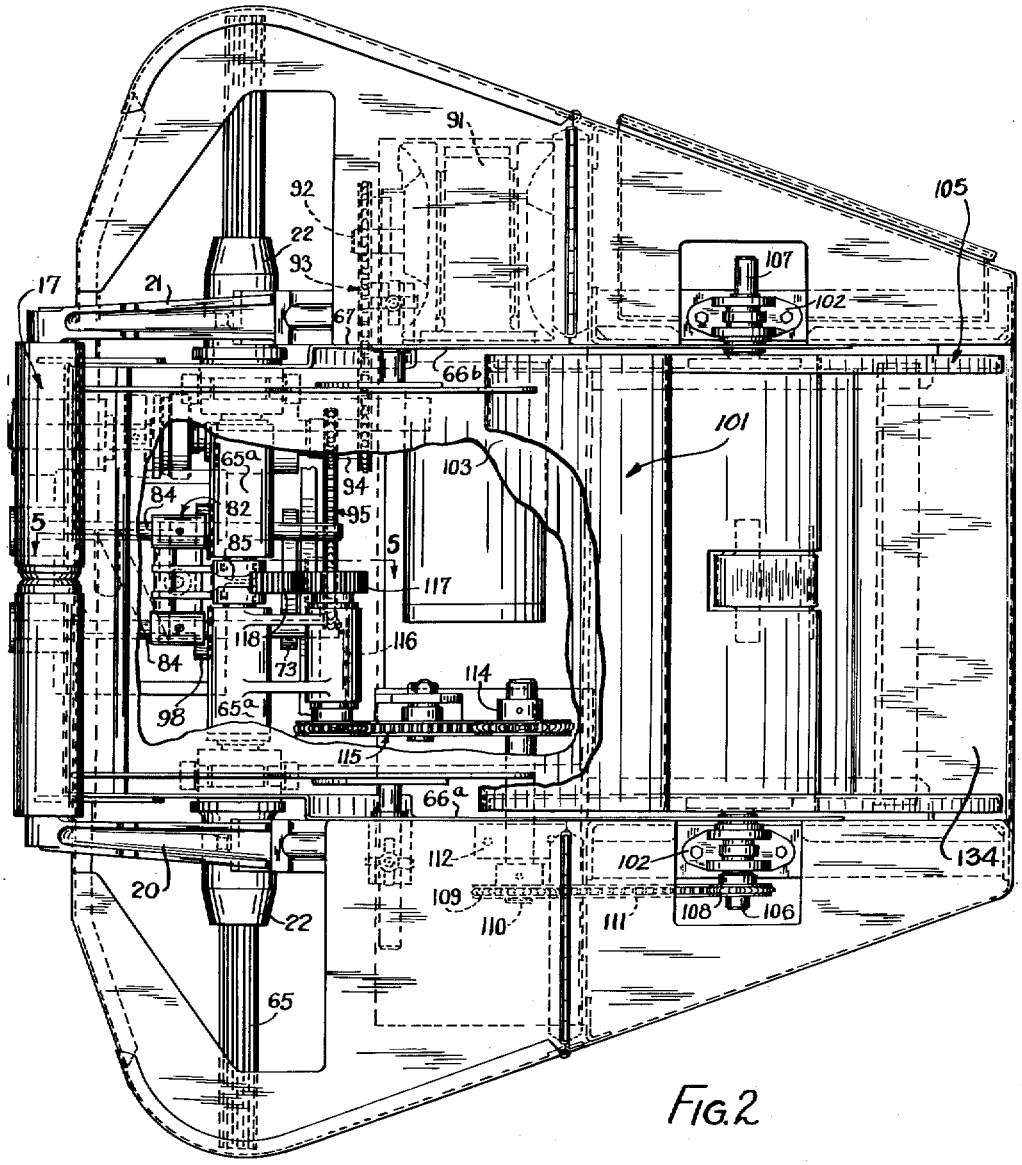
FIG. 2 is a top plan view of the apparatus shown in FIG. 1.
Figure 3:
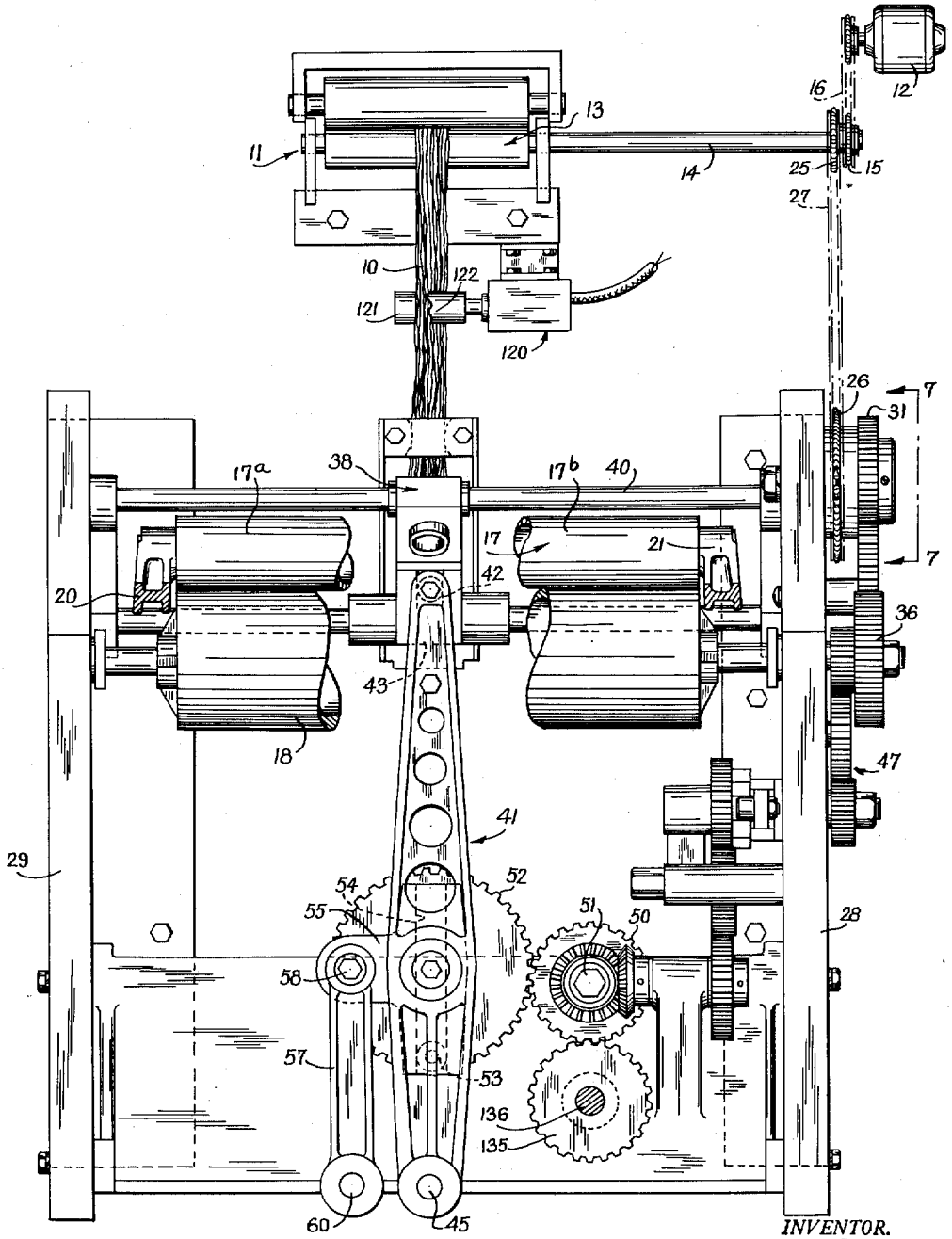
Figures 4, 10:
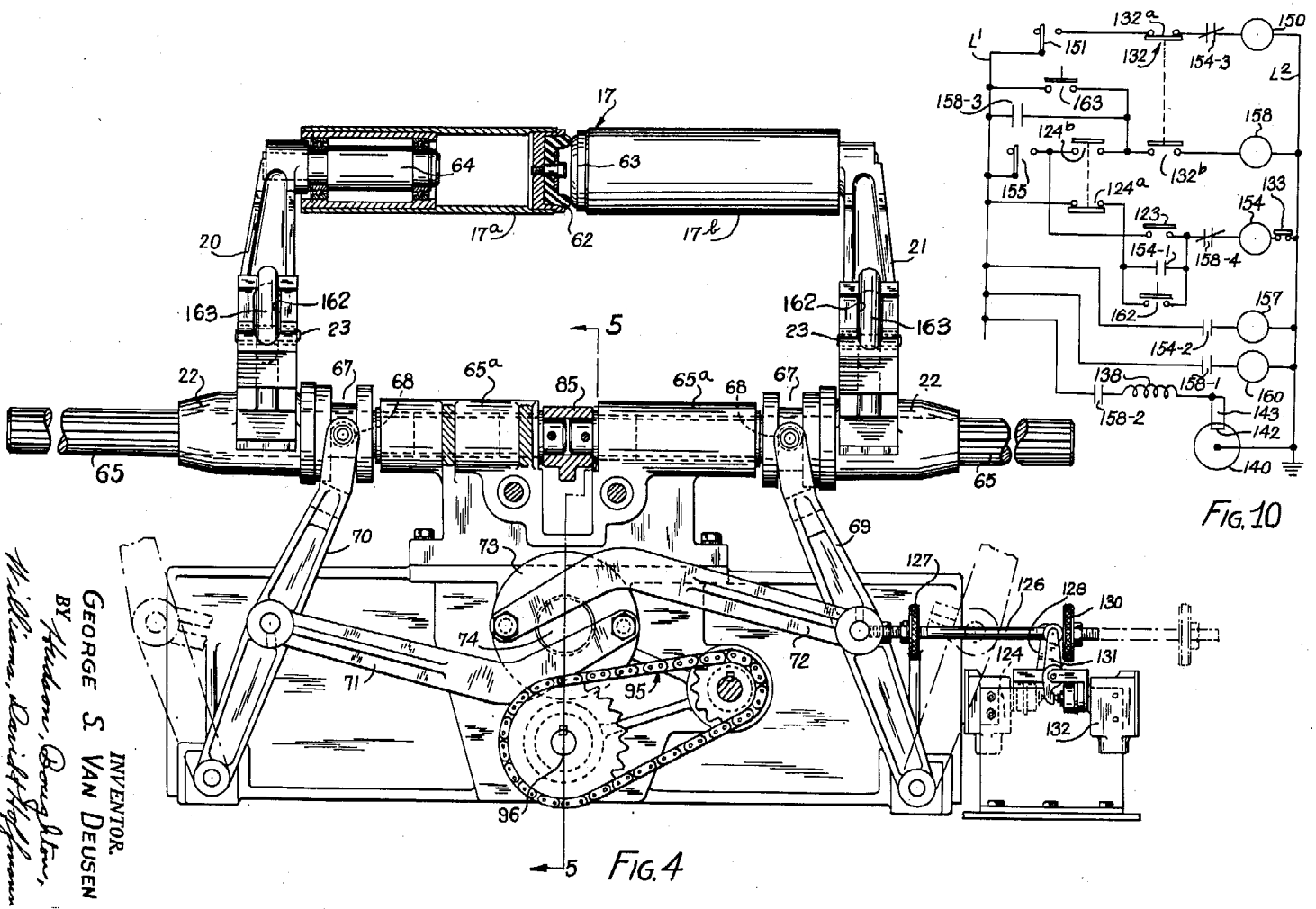

FIG. 3 is a view taken in a plane perpendicular to the center line of the balling apparatus and adjacent the left-hand end of the portion of the apparatus shown in FIG. 1 and looking toward the left from the apparatus shown in FIG. 1 toward a gill box which supplies sliver to be formed into a ball by the apparatus and showing the arbor from which the ball is formed and the mechanism for guiding the ball onto the arbor and rotating the ball and arbor;

FIG. 4 is a sectional view taken approximately along line 4—4 of FIG. 1;

FIG. 5 is a sectional view taken approximately along line 5—5 of FIG. 2;

FIG. 6 is a sectional view taken approximately along line 6—6 of FIG. 5;

FIG. 7 is a view looking from line 7—7 of FIG. 3 in the direction of the arrows;

FIG. 8 is a fragmentary sectional view taken approximately along line 8—8 of FIG. 7;

FIG. 9 is a sectional view taken approximately along line 9—9 of FIG. 1; and

FIG. 10 is a simplified schematic electrical diagram for the apparatus shown.

Referring to the drawings, the balling apparatus is adapted to form a sliver 10 into a ball and then to doff the ball. The sliver 10 is shown in FIG. 3 as exiting from a gill box 11 which is driven by a motor 12. The gill box 11 is not shown in any detail since such gill boxes are well known to those skilled in the art and the gill box may be of any conventional construction. Insofar as the drawing is concerned, the gill box 11 is shown as having nip rolls 13 from which the sliver 10 exits and a drive shaft 14 for driving the gill box 11 including nip rolls 13. The drive shaft 14 has a sprocket 15 secured to the outer end thereof and is driven from the motor 12 by a chain 16.

The sliver from the gill box 11 is wrapped onto a rotatable arbor 17 to form a ball. The arbor 17 is initially positioned adjacent a drive drum 18 which is rotated to effect rotation of the arbor 17, as is well understood by those skilled in the art. The sliver 10 passes between the drum 18 and the arbor 17 and it is wrapped on the arbor due to the rotation of the arbor and ball thereon by the drum 18, and as the ball forms the arbor 17 moves upwardly away from the drum 18 to accommodate the increasing size of the ball. The arbor 17 is supported for movement toward and away from the drum 18 by arms 20, 21 at each end of the arbor respectively. When the arbor 17 is disposed immediately adjacent the top of the drum 18, the arms 20, 21 extend downwardly and to one side of the arbor, the right side as the latter is viewed in FIG. 1, and are each pivoted to a respective support member 22 by a pivot connection 23. The pivot connections 23 allow the arms 20, 21 to freely pivot so that the arbor 17 can move freely away from the drum 18 as the ball builds up on the arbor.

The drum 18 is rotated from the drive shaft 14 for the gill box 11. The drive shaft 14 has a sprocket 25 fixed thereto which is connected to a sprocket 26 by a chain 27. The sprocket 26 is journalled on a side frame 28 which is one of a pair of side frames 28, 29 which rotatably support the driving drum 18. The sprocket 26 is connected to drive a gear 31 (see FIG. 8) journalled on the hub of sprocket 26 by means of an overrunning clutch mechanism 32 disposed between the hub of the gear 31 and the outer periphery of the hub of the sprocket 26. As is conventional in such type mechanisms, the overrunning clutch mechanism comprises a plurality of members 33 fixed to the hub of the sprocket 26 for rotation therewith and defining with the hub a plurality of openings 34 which provide inclined surfaces upon which rollers 35 are disposed. The rollers 35, when the sprocket 26 is rotated in a clockwise direction, as viewed in FIG. 7, ride up the inclined surfaces to drive the gear 31 and ride down the inclined surfaces to release the gear 31 when the gear 31 is driven ahead of the sprocket 26 or the sprocket 26 rotated in a direction opposite to the first-mentioned direction.

The gear 31 is connected by an intermediate gear to rotate a drive gear 36 fixed to the shaft of the drum 18 to effect a rotation of the drum.

The sliver 10 is guided onto the arbor 17 by a sliver guide member 38 supported on a bar 40 for movement along the length of the arbor 17. The bar 40 extends between and is supported by the side frames 28 and 29. The guide member 38 is reciprocated, in the illustrated and preferred embodiment, by a traverse arm 41 having its upper end connected to the guide member 38. The upper end of the traverse arm 41 has a roller 42 which is received in a slot 43 in the guide member 38 and the lower end of the traverse arm is pivoted to a stub shaft 45 extending parallel to the center line of the apparatus.

The traverse arm 41 is reciprocated about the shaft 45 from the shaft of the drum 18 through a drive 47 comprising a plurality of gears journalled to the side frame 28 and including an output gear 50 supported for rotation by a shaft 51 extending parallel to the side frame 28. The gear 50 meshes with a gear 52 which has mounted thereon a roller 53 that is received in a slot 54 in a member 55 journalled in the traverse arm 41. Rotation of the roller 53 with the gear 52 effects reciprocation of the traverse arm 41. The slot 54 in the member 55 is maintained in a vertical position through the operation of a link 57 pivoted to the member 55 at the point indicated by the reference numeral 58 and to a stationary stub shaft 60 adjacent the shaft 45 and extending parallel thereto. The link 57 forms with the traverse arm 41 a parallel linkage which maintains the slot 54 vertical as the roller 53 is rotated. It will be seen that the guide member 38 will be reciprocated from the center position shown in FIG. 3 to one end of the arbor 17, back to the center position, to the other end of the arbor 17, and then back to the center position for each revolution of the gear 52. The gear 52 has, therefore, a unique angular position corresponding to the center position of the guide member 38 along the length of the arbor 17. The mechanism for driving the traverse arm 41 is disclosed in more detail in the application for Letters Patent S.N. 821,938 filed January 22, 1959 by Haug et al.

To start the ball forming on the arbor 17, it is necessary for the arbor 17 to grip the sliver 10. To this end, the arbor 17 is formed by a pair of half arbors 17a, 17b which are disposed in end-to-end aligned relationship while the ball is being formed thereon. The inner end of the half arbor 17a has fixed thereto a cup 62 of resilient material which extends outwardly to engage the adjacent end 63 of the half arbor 17b. The sliver 10 is gripped between the cup 62 and the end 63 to start the ball forming on the arbor 17. As is also shown in FIG. 4, the half arbor 17a is supported for rotation on a stub shaft 64 which extends inwardly from the adjacent end of the arm 20. The half arbor 17b is supported for free rotation with respect to the arm 21 in the same manner as described for the half arbor 17a.

The half arbors 17a, 17b are movable toward and from engagement with each other to enable the half arbors to be opened to doff a ball which has been formed thereon and closed to grip a sliver therebetween. To this end, the support members 22 for the arbor arms 20, 21 are supported for axial movement on a spline shaft 65 extending parallel to the arbor 17 and between spaced side plates 66a, 66b forming a continuation of the side frames 28, 29. The shaft 65 is shown as a two-part shaft journaled in support castings 65a. The support members 22 are rotatable with the shaft 65 while slidable axially with respect thereto and the shaft 65 is oscillated about its axis to oscillate the members 22 to move the arbor 17 between a balling position and a ball-doff position.

The support members 22 each have an annular recess or groove 67 therein adapted to receive a roller 68 fixed to the upper end of a respective one of levers 69, 70, respectively. The levers 69, 70 are pivoted at their lower ends to the frame of the balling apparatus.

Connected to the levers 69, 70 intermediate their ends, are actuating links 71, 72, respectively. The actuating links 71, 72 each have one end pivoted to the levers 69, 70 and the other end pivoted to a rotatable disk 73 journaled on the end of a shaft 74, FIGS. 4 and 5. The actuating links are pivoted to the disk at points 180° apart, with the points of connection of each being on the side of the disk remote from the lever to which the link is connected when the half arbors are together so that the support members 22 will be moved away from each other for 180° of rotation when the disk is rotated from the position shown in FIG. 4 and then toward each other if the disk is then rotated back to the position of FIG. 4.

The shaft 74 has a drive member 76 fixed thereto adjacent and inwardly of the disk 73. The drive member 76 carries a pin 77 which is received in an arcuate slot 78 in the adjacent face of the disk and abuts one end or the other of the slot to drive the disk with drive member 76. The slot extends for approximately 180° about the disk and provides for lost motion of approximately 180° when the direction of rotation of the drive member 76 is reversed. It can be seen that if the shaft is reversed each time it rotates one revolution, the drive member 76 will operate through the lost motion connection provided by the pin 77 and the slot 78 to oscillate the disk 73 through approximately 180° movements, with a dwell of 180° occurring between each movement.

The shaft 74 also has fixed thereto a cam drum 80 for oscillating the shaft 65 to move the arms 20, 21 and the arbor 17 between balling and doffing positions. The cam drum 80 cooperates with a cam follower 81 carried by a slide 82 supported for sliding movement parallel to the shaft 74 and transversely of shaft 65 by parallel bar-type ways 84. (See FIGS. 2 and 5.) The shaft 65 has a crank member 85 fixed thereto and a link 86 is pivotally connected at one end to the crank member and at its other end to the slide 82 so that reciprocation of the slide 82 effects a rocking or oscillation of the shaft 65.

The cam drum 80 has a cam track 88 which, when the drum is rotated from its position of FIG. 5 in a clockwise direction, viewing the left-hand end of the drum in FIG. 5, the slide 82 is moved to the right, and this causes a counterclockwise rotation of the shaft 65, as viewed in FIG. 5, to lower the arms 20, 21 and the arbor 17. The helical track 88 extends for approximately 180° and joins an annular track 89 which provides a dwell for approximately 180° of revolution. It can be seen, therefore, that if the parts are in the position shown in FIG. 5 and the shaft 74 rotated to move the slide 82 to the right, the slide will move to the right for 180° of revolution of the shaft 74 to drop the arms 20, 21 and then dwell for 180°, and if the direction of rotation is reversed after one revolution, the slide will dwell for 180° and then return to the position of FIG. 5 to raise the arms 20, 21.

The shaft 74 is oscillated one revolution in each direction to drop and raise the arms 20, 21 and open and close the arbor 17 by a reversible motor 91, shown in FIG. 2. The motor has an armature shaft 92 connected by a chain drive 93 to rotate an intermediate shaft 94. The intermediate shaft 94 is, in turn, connected by a chain drive 95 to rotate a shaft 96 having a gear 97 fixed thereto and meshing with a gear 98, see FIG. 5, formed on the cam drum 80 to rotate the drum and shaft 74.

The reciprocation of the slide 82 upon the reversal of the motor 91 after each revolution of the shaft 74 also effects the rotation of a ball-receiving drum 101 between a ball-receiving position and a ball-delivery position. The drum 101 is shown in FIGS. 1 and 2 and, as shown therein, the drum 101 is journalled to the right of the arbor 17 in bearing blocks 102 mounted adjacent the side members 66a, 66b and the arms 20, 21 for supporting the arbor, as the apparatus is viewed in FIGS. 1 and 2. The drum 101 is disposed at the exit end of a chute 103 supported below the arbor 17a between the arms 20, 21 and between the side members 66a, 66b and is adapted to catch the formed ball when it is dropped by opening the half arbors 17a, 17b upon completion of the balling operation. As is best shown in FIG. 1, the chute 103 is inclined downwardly to the drum 101 so that the ball, when dropped, will roll toward the drum. The drum 101 has an opening therein which extends, in the illustrated embodiment, for approximately 180° and is designated by the reference numeral 105. When the drum is in the position shown in FIG. 1, the opening 105 is positioned so that an operator standing at the end of the balling apparatus can lift a formed ball from the drum and the drum is rotatable to a position wherein the opening 105 is disposed in a position to receive a ball rolling down the chute 103. As is best shown in FIG. 2, the drum 101 is supported for rotation by trunnions 106, 107 which are journalled in the bearing blocks 102 and extend outwardly thereof. The outer end of the trunnion 106 has a sprocket 108 fixed thereto and connected to be driven from a sprocket 109 on a shaft 110 by a chain 111. The shaft 110 is journalled in a support casting 112 and has a sprocket 114 thereon which is driven by a chain drive 115 from a shaft 116. The shaft 116 is rotatably supported alongside of the shaft 65 and has a gear 117 fixed thereto and the gear 117 meshes with a gear segment 118 formed on the crank member 85 which is fixed to the shaft 65 and which is oscillated by the slide 82 to effect the oscillation of the shaft 65 to drop and raise the arms 20, 21. The shaft 116 will be oscillated with shaft 65 and, in turn, the shaft 110 and the trunnion 106 will be oscillated with shaft 65 to oscillate the drum 101. The drum 101 is, then, rotated between its ball-receiving positions and its ball-delivery positions simultaneously with the dropping and raising of the arms 20, 21.

It can now be seen from the foregoing description that as a sliver is wound on the arbor 17, the arbor will move upwardly about the axis of the pivot connections 23 connecting the arms 20, 21 to the support members 22 and when the ball has been completed, the ball may be doffed by starting the motor 91. For the first 180° of rotation of the motor shaft, the cam drum 80 will effect a movement of the slide 82 to the right from the position shown in FIG. 5 until the cam follower 81 is riding in the dwell portion of the cam track and this, as described above, will cause the arms 20, 21 to drop and the drum 101 to be rotated to a ball-receiving position. It will be remembered that the shaft 74 upon which the drum 80 is fixed is connected to drive the disk 73 for opening and closing the arbors through a lost motion connection provided by the pin 77 and the slot 78 and, for the first 180° of rotation of the shaft 74, no movement is imparted to the disk 73. Beginning with the second 180° of rotation of the drum 80, the cam follower 81 for reciprocating the slide is riding in the dwell track on the cam drum but the pin 77 has engaged an end of the slot 78 and effects rotation of the cam disk 73. Rotation of the disk 73 causes the arms 69, 70 to move apart and to slide the members 22 along the shaft 65 to open the arbors. At this point, the portion of the cycle for doffing the ball has been completed and it is desirable to reverse the motor to raise the arms, close the arbors, and rotate the drum 101 to a ball-delivery position. Upon reversal of the motor 91, the first 180° of rotation of the shaft 74 produces no movement of the arms 20, 21 for supporting the arbor since the cam follower 81 for effecting the dropping and raising of the arm is being returned along the dwell portion of the cam track and the pin 77 must rotate approximately 180° to the other end of the slot 78 before the disk 73 is rotated. Therefore, the ball has during the first 180° of rotation of the shaft 74 time to roll down the chute into the drum 101. The second 180° of return rotation of the shaft 74 causes the cam follower 81 to ride across the helical portion of the cam track on the cam drum 80 to effect a clockwise rotation of the shaft 65, as the latter is viewed in FIG. 5, to raise the arms and rotate the drum to a ball-delivery position. Simultaneously with the raising of the arms 20, 21, the pin 77 will have engaged the other end of the slot 78 and will have rotated the disk 73 to effect a closing of the half arbors. At the beginning of the portion of the cycle where the arms are being raised, the arbors closed, and the drum returned, the sliver is lying over the drive drum 18 along the bottom of the chute and is still connected to the ball in the drum 101. As the drum 101 is rotated to move it to the ball-delivery position, the trailing end of the opening 105 will lift the sliver from the bottom of the chute and carry the sliver upwardly with the trailing end of the drum. At the time that the half arbors 17a, 17b close upon each other, the sliver is positioned therebetween, and the fact that the sliver is lifted by the drum aids in assuring that the sliver will be so positioned, and the closing of the half arbors 17a, 17b grips the sliver therebetween. After the arms have been closed, the motor is stopped and the apparatus is ready to form a new ball.

The motor 91 is, in the illustrated embodiment, controlled by a yardage counter which measures the length of sliver that exits from the gill box 11. The yardage counter is designated by the reference numeral 120 and is shown in FIG. 3 as comprising a pair of rolls 121, 122 between which the sliver 10 passes. The sliver 10 effects rotation of the roll 122 and when the roll has rotated a predetermined angular amount, it is indicative of the fact that a predetermined yardage has been wound onto the ball being formed. A predetermined angular rotation of the roll 122 effects the actuation of an electrical switch 123 contained in the yardage counter and shown only schematically in FIG. 10 to stop the drive motor 12 for operating the gill box and to start the motor 91 for initiating the ball doffing cycle. The motor 91 rotates in the direction necessary to drop the arms of the arbor and to open the arbor and when the arms are open, and is reversed by the actuation of a switch 124 supported adjacent the lever 69 for operating one support member 22. The lever 69 has a rod 126 threaded into it and extending outwardly therefrom toward the switch 124 and as the arm is opened, an adjustable stop 127 on the rod 126 moves toward an actuator 128 for the switch 124 and when the arms are open, strike the actuator 128 to operate the switch 124 to reverse the direction of motor operation. The rod 126 carries a second adjustable stop 130 which, when the lever 69 is returned to its position where the arbors are closed at the end of the doffing cycle, engages and operates a switch actuator 131 for a switch 132 which stops the motor 91 and starts the motor 12 to again feed sliver 10 to the balling apparatus and rotate the drive drum 18 for forming the sliver into a ball on the arbor 17. As the arbor 17 starts to rotate, the rotation thereof will break the sliver connection between the arbor and the ball and the ball then can be lifted from the drum 101.

A safety switch 133 is preferably supported adjacent the drum 101 and is operated by the weight of the formed ball when the drum 101 is returned to a ball-delivery position to prevent energization of the motor 91 until the ball is removed from the drum. In the illustrated embodiment, the weight of the ball depresses a resiliently supported switch actuating plate 133a to operate the switch 133. Preferably the drum 101 is rotated sufficiently so that the ball, due to its own weight, will start to roll from the drum onto a delivery plate 134 so as to clear the switch 133. If the switch 133 is cleared, the rotation of the drum upon the starting of motor 91 will kick the ball clear of the drum if it has not been removed or has not rolled clear of the drum.

It is desirable that the guide member 38 be positioned opposite the point at which the sliver is gripped by the arbor 17 at the beginning of each ball to be formed. In the apparatus illustrated, the sliver is gripped between the half arbors 17a, 17b and, therefore, the guide member 38 is preferably positioned in its center position with respect to the arbor 17. In accordance with the present invention, the guide member 38 is automatically positioned during each ball doffing cycle so that it will be opposite the point of connection of the sliver 10 to the arbor for starting the next ball. To this end, a second power drive is provided for actuating the traverse arm 41 which is reciprocated to effect a reciprocation of the guide memebr 38. This second drive is connected into the previously described drive for actuating the traverse arm 41 at the gear 50. It will be recalled that the gear 50 meshes with the gear 52 that carries the roller 53 for effecting a reciprocation of the traverse arm. As is shown in FIG. 3, a gear 135 is fixed to a shaft 136 and meshes with the gear 50 and has, in the preferred embodiment, one-half the number of teeth on the gear 52. The shaft 136 extends parallel to the center line of the balling apparatus and is supported in alignment with the intermediate shaft 94 driven by the motor 91. It will be recalled that the shaft 94 is the intermediate shaft in the drive between the motor 91 and the shaft 96 for effecting a rotation of the shaft 74.

The adjacent ends of the shaft 94 and the shaft 136 can be interconnected in driving relationship by an electromagnetic clutch 138 (FIGS. 1 and 9) of conventional construction, and therefore, not shown or described in detail. When the clutch 138 is energized the shafts 94, 136 are connected in driving relationship.

The energization of the clutch 138 is under the control of means for sensing the position of the guide member 38 and operable to energize the clutch 138 when the guide member 38 is displaced from a center position during the ball-doffing cycle. The mechanism or means for sensing the position of the guide member 38 comprises a control member 140 fixed to the shaft 136 and shown in FIGS. 1 and 9. The control member 140 is rotated in a one-to-one relationship with the gear 135 which has the same number of teeth as its drive gear 50. The control member 140 is therefore rotated in a one-to-one relationship with the gear 50. The gear 135 has half the number of teeth of the gear 52, and one complete rotation of the gear 135 will move the guide member 38 through one-half of its complete cycle. Therefore, there is a unique position of the gear 135 which corresponds to the center position of the guide member 38, and a corresponding unique angular position of the shaft 136, and in turn, of the control member 140 which corresponds to the center position of the guide member 38. The control member 140 is a metallic electrically conductive member having an insulated segment 142 set in the periphery thereof. This insulating segment is engaged by an electrically conductive spring biased plunger 143 when the control member 140 is in the unique position thereof which corresponds to the center position of the guide member 38. The plunger 143 has a rod 144 which extends through a bushing 145 which supports the plunger 143 for movement and which has an electrical connection 146. The insulating insert 142 and the plunger 143 form a swtich which opens when the plunger is on the insert and which is closed to connect the connection 146 to the control member 140, and thence to ground, when the plunger 143 is disposed anywhere along the control member 140 except on the insulating insert 142.

Whenever the electrical connection 146 is grounded to the control member 140, the clutch 138 is energizable to connect the shaft 94 to the shaft 136 to drive the gear 50 and reciprocate the transverse arm 41 until the guide member 38 is returned to its center position. It will be recalled that the shaft 94 is rotated by the motor 91 during the doffing operation. In the illustrated embodiment the circuit for energizing the clutch 138 is conditioned to be effective during the reverse operation of the motor 91 to raise and close the arms 20, 21 and the centering will occur during the first 180° of reverse rotation of the cam drum 80 immediately prior to the closing and raising of the arms.

The overruning clutch mechanism 32 allows the shaft 94 to drive the gear 50 without driving the gill box through the chain 27.

While the control member 140 is, in the illustrated embodiment, rotated twice for each complete cycle of reciprocation of the traverse arm 41 it will be appreciated by those skilled in the art that it could be rotated once for each complete cycle and the control member 140 would then have a unique position for each position of the guide member 38, considering the guide member as having different positions when moving through the same position in space but in different directions. The control member 140 could then also be provided with two insulated inserts in the event that the guide member 38 is to be returned to a center position. It will also be appreciated by those skilled in the art that the control member 140 and the insulating inserts could be timed and positioned so that the guide member 38 is returned to any selected position along the length of the arbor. Also, any suitable sensing mechanism for sensing the position of the control member 140 may be utilized. The control member 140 may also be provided with a periphery of insulating material and a conductive insert, or photoelectric or electromagnetic means might be utilized to sense the position of the control member 140, as will be well appreciated by those skilled in the art.

A simplified circuit diagram is shown in FIG. 10 of the drawings. Referring to FIG. 10, the motor 12 for driving the gill box and reciprocating the traverse arm 41 is energized and de-energized by a motor control relay 150, the motor 12 being energized when the relay 150 is energized. The motor control relay 150 is energizable by closing a switch 151 and is energized upon the closing of the switch 151 by a circuit completed from L1 to L2 and through the relay 150, provided the contacts 132a of switch 132 are closed indicating that the support arms 20, 21 are in their balling position. After the motor 12 has operated sufficiently long to supply the length of fiber necessary to form a ball of the desired size, the yardage counter 120 closes its contacts 123 which complete a circuit to energize a relay coil 154 provided an "Automatic" switch 155 is closed. The "Automatic" switch 155 connects one side of the contacts 123 to L1 and the other side of the contacts 123 is connected to the relay coil 154 and then to L2. The energization of the relay coil 154 closes its normally open contacts 154–1, 154–2 and opens its normally closed contacts 154–3 in the circuit for energizing the relay coil 150 for operating the motor 12, thus stopping the motor 12. The closing of the contacts 154–1 completes a holding circuit for the relay coil 154 from L1 through contacts 124a of the switch 124 to maintain the relay coil 154 energized after the opening of the yardage counter switch 123, the latter switch normally being operated momentarily.

The closing of the contacts 154–2 effects the energization of a forward contactor 157 for the motor 91 and the motor 91 operates in a forward direction to first drop the support arms 20, 21 and then to open the arms to doff the ball formed on the half arbors. When the arms start to open, the switch 132 will be actuated to open its contacts 132a and to close its contacts 132b to condition a circuit for energizing a relay coil 158. When the arms 20, 21 are fully opened, the stop 127 actuates the switch 124 to close its contacts 124b and open its contacts 124a to break the holding circuit for relay coil 154. The deenergization of relay coil 154 drops out the forward motor contactor 157 to stop operation of motor 91 in a forward direction. The closing of the contacts 124b completes the circuit for energizing, through the contacts 132b, the relay coil 158 and the energization of relay coil 158 closes its contacts 158–1, 158–2, 158–3. The contacts 158–1 are in a circuit for energizing a reverse motor contactor 160 for effecting operation of the motor 91 in a reverse direction. The relay coil 158 also has normally closed interlocking contacts 158–4 in the circuit for energizing the relay coil 154 which, as it will be recalled, effects the energization of the forward motor contactor 157. It can be seen, therefore, that upon the energization of relay coil 158 the circuit for operating the motor 91 in a forward direction is broken and a circuit for initiating the operation of the motor in a reverse direction is completed. The energization of relay coil 158 is maintained on the reversal of motor 91 and the opening of switch 124 by the holding contacts 158–3 connected in parallel with the "Automatic" switch 155 and the contacts 124b of the switch 124.

The closing of the contacts 158–2 effects the energization of the electromagnetic clutch 138 provided the control member 140 is not in its unique position where the circuit to ground through the control member is broken. The energization of the electromagnetic clutch will effect the return of the traverse arm 41 to its center position if the arm is displaced therefrom. When the motor 91 is operated in a reverse direction, a dwell first occurs and then the arms 20, 21 are raised and the members 22 are, simultaneously with the raising of the arms, moved toward each other to close the arbors. When the arbors are closed, the switch 132 will again be operated to open its contacts 132b which breaks the holding circuit for energizing the relay coil 158 and to close the contacts 132a, which then initiates operation of the motor 12 to supply sliver to the guide member and effect the reciprocation of the traverse arm 41.

If the "Automatic" switch 155 is left in its "off" position, the yardage counter 120 is ineffective to start the ball doffing cycle. The motor 91 can, however, be operated by depressing a pushbutton switch 162 to operate the motor 12 in a forward direction and a pushbutton switch 163 to operate the motor 12 in a reverse direction. The pushbutton switches 162, 163 are in parallel with the holding contacts 154–1, 158–3 for relay coils 154, 158 respectively.

It will be recalled that the ball delivery drum 101 is rotated between ball-receiving and ball-delivery positions upon the lowering and the raising of arms 20, 21. The safety switch 133 can be connected into the circuit for energizing relay coil 154 as shown in FIG. 10, so that if a ball is depressing the switch, the doffing cycle cannot be started.

In addition to the foregoing, it will be noted that the support arms 20, 21 each have an opening 162 in the lower end thereof which receives a post 163 of the corresponding support member 22. The pivot connections 23 connect the support arms 20, 21 to the corresponding post for the described pivotal movement. It will be noted that when the arms are dropped, as is shown in phantom in FIG. 1, surfaces 165 on the arms 20, 21 engage mating surface 166 on the corresponding support member 22 to limit the movement of the arms 20, 21 toward the driving drum 18 so that when the ball is removed, the arms will not fall of their own weight. When the support members are oscillated counterclockwise to raise the arm, the arms 20, 21 will follow the surfaces 166 until the arbor 17 rests on the drum, at which time the arms will lose engagement with the surfaces 166 as the support members 22 are rotated to their fully raised position. It will also be noted that the lower ends of the arms 20, 21 will engage the support members 22 adjacent the base of the posts 163 to assure that the arms do fall in the direction of the drum 101.

It can be seen that the present invention provides a new and improved balling apparatus having a novel and improved structure for accommodating ball build-up and for supporting the arbor support arms and the half arbors for movement between ball doffing and balling positions, and new and improved means for actuating the half arbors and supports therefore to open and close the arbors and to move the arbors between balling and doffing positions. Furthermore, the present invention provides a new and improved apparatus wherein a balling drum is automatically rotated between ball-receiving and ball-delivery positions during the ball-doffing cycle and wherein the traverse arm is returned by power to a predetermined position preparatory to the starting of each new ball.

Further modifications, constructions, and arrangements will appear on those skilled in the art and it is hereby my intention to cover all such modifications, constructions, and arrangements which fall within the ability of those skilled in the art and the scope and spirit of the present invention. While the word "sliver" has been used in the specification and claims, it is to be understood that this term is intended to cover threads, strands, etc., which are wound into a ball in a balling apparatus.

Having thus described my invention, I claim:

1. In a balling apparatus for forming a strand or sliver of material into a ball, an arbor upon which the strand is wound to form a ball, a driving drum cooperating with said arbor to rotate the latter end engageable with the periphery of said arbor or the ball thereon to effect a rotation of the arbor, support means for said arbor comprising a support arm rotatably supporting said arbor, a member supporting said support arm for movement in a direction away from said driving drum and about a first axis offset from the axes of said driving drum and arbor to accommodate the build-up of a ball on said arbor, and means supporting said member for oscillation about a second axis offset from said first axis and the axes of said drum and arbor to move said arbor between a doffing position and a balling position.

2. In a balling apparatus as defined in claim 1 wherein said first and second axes are disposed laterally to one side of said driving drum and said arbor moves upwardly from said driving drum about said first axis to accommodate ball build-up and wherein said member is oscillated about said second axis to drop said arm to doff the ball.

3. In a doffing apparatus as defined in claim 1 and further comprising a reversible power actuated means operatively connected to said member to oscillate the latter.

4. In a balling apparatus as defined in claim 3 wherein said first and second axes are disposed laterally to one side of said driving drum and said arbor moves upwardly from said driving drum about said first axis to accommodate ball build-up and wherein said member is oscillated about said second axis to drop said arm to doff the ball.

5. In a balling apparatus for forming a sliver of material into a ball, an arbor upon which the sliver is wound to form a ball, a driving drum cooperating with said arbor to rotate the latter and engageable with the periphery of said arbor or the ball thereon to effect a rotation of the arbor, support means for said arbor comprising a support arm rotatably supporting said arbor, a member supporting said support arm for movement away from said driving drum about a first axis offset from the axes of said driving drum and said arbor to accommodate the build-up of a ball thereon, means supporting said member for oscillation about a second axis offset from said first axis to move said arbor between a ball-doffing position and a ball-forming position, reversible power-actuated means operatively connected to said member for oscillating said member to move said arbor between a balling position and a ball doffing position, and means responsive to a condition indicative of the forming of a ball of predetermined size on said arbor for initiating operation of said reversible power actuated means in one direction to move said arbor to a ball-doffing position and responsive to a condition indicative of the doffing of the ball from the arbor to reverse said power-actuated means and operate the latter in its opposite direction to return said arbor to a balling position.

6. In a balling apparatus, an arbor comprising a pair of aligned half arbors disposed in end-to-end relationship and upon which a sliver is wound to form a ball, [a support arm journally supporting each of said half arbors at the outer end thereof,] a driving drum engageable with the outer periphery of said half arbors or the ball thereon to effect a rotation of the half arbors and a winding of the sliver, first and second support members, *means supporting said arbors comprising* first means [pivoting] *connecting* said [arms] *arbors* to a respective one of said members for free [pivotal] movement [about a common axis] to *a ball-formed position to* accommodate build-up of a ball on said arbors, second means supporting said members for relative movement toward and away from each other [and for selective movement about a second axis parallel to said common axis but offset therefrom] to move said *arbors* [arms] *from a ball-formed*

*position to* [between] a ball-doffing position [and a balling position], and actuating means operatively connected to said members for moving said members in one direction *to said ball-doffing position* [about said second axis] and away from each other to doff a ball and operable in an opposite direction for moving said members toward each other and [in their other direction about said axis] to return said members to a balling position *adjacent said drum.*

7. In a doffing apparatus as defined in claim 6 wherein said second means comprises a rotatable shaft and means slidably keying said members to said shaft and said actuating means comprises first drive means operatively connected to said shaft for oscillating said shaft to move said [arms] *arbors* from and to their balling position and second drive means operatively connected to said members for reciprocating said members along said shaft to open and close said [arms] *arbors.*

8. In a doffing apparatus, the structure as defined in claim 7 wherein said actuating means comprises a reversible motor for operating said first and second drive means.

9. In a doffing apparatus as defined in claim 8 wherein control means is provided for said motor for reversing said motor in response to the opening of said [arms] *arbors* and stopping said motor in response to the closing of said [arms] *arbors.*

10. In a doffing apparatus as defined in claim 6 wherein said actuating means comprises a movable drive member movable from a first position to a second position and return, and means driven by said drive member during the first portion of its movement from its said first position to its second position to move said first and second support members to move said arbors away from a balling position and during the last portion of its return movement from its said second position to its said first position to actuate said first and second support members to move said arbors to a balling position, a second drive member driven from a first position to a second position and return with said movable drive member, and means actuated by said second drive member during the last portions of its movement between said positions to respectively move said first and second support members toward and away from each other.

11. In a doffing apparatus as defined in claim 10 wherein said means actuated by said second drive member comprises a driven member and a pin carried by one of said second drive member and driven member, and received in a slot in the other one thereof and providing a lost motion connection therebetween, and means connecting said driven member to said support members to move the latter toward and away from each other upon reciprocation of said driven member.

12. In a doffing apparatus as defined in claim 10 wherein said movable drive member is a cam drum having a helical cam surface thereon and a joining annular dwell surface effective to oscillate said support members during the first and last portions of its movements from said first to said second positions and return, respectively.

13. In a doffing apparatus as defined in claim 12 wherein said means actuated by said second drive member comprises a driven member and a pin carried by one of said second drive member and driven member, and received in a slot in the other one thereof and providing a lost motion connection therebetween, and means connecting said driven member to said support members to move the latter toward and away from each other upon reciprocation of said driven member.

14. In a balling apparatus, an arbor comprising a pair of aligned half arbors disposed in end-to-end relationship and upon which the sliver is wound to form a ball, a support arm journally supporting each of said half arbors at the outer end thereof, a driving drum engageable with the outer periphery of said half arbors or the ball thereon to effect a rotation of the half arbors and a winding of the sliver, first and second support members, means pivoting said arms to a respective one of said support members for free pivotal movement about a common axis to accommodate build-up of a ball on said arbors, an oscillatable shaft having an axis parallel to said common axis, means connecting said first and second members to said shaft for oscillation therewith, and for relative axial movement with respect thereto, the oscillation of said members with said shaft actuating said arbors between balling and doffing positions, a first driven member reciprocable between first and second positions, means operatively connecting said driven member to oscillate said shaft upon reciprocation of said driven member to move said arm between their said positions, a second driven member reciprocable between first and second positions, means operatively connecting said second driven member to said first and second support members to move said support members relative to said shaft toward and away from each other on reciprocation of said second driven member to close and open said arbors, reversible drive means operable in forward and reverse movements from and to a predetermined position, means interconnecting said drive means and said first driven member to actuate the first driven member from its first position to its second position during the first part of the operation of said drive means in a forward direction and to actuate said first driven member from its second position to its first position during the last part of its reverse movement, and means interconnecting said drive means and said second driven member to actuate said second driven member between its position during the last parts of the forward and reverse movements of said drive means.

15. In a doffing apparatus as defined in claim 14 and further comprising a ball-delivery drum disposed to receive a ball from said arbors, means supporting said ball-delivery drum for rotation between a receiving and a discharging position and means operated by said first driven member to oscillate said ball-delivery drum between its said positions on reciprocation of said first driven member.

16. In a balling apparatus as defined in claim 14 wherein said drive means comprises a drive shaft, reversible power means for rotating said drive shaft in forward and reverse directions, cam means interconnecting said drive shaft and first driven member to first actuate said first driven member in one direction and then dwell upon rotation of said drive shaft in a forward direction and upon reversal of the drive shaft to dwell and then actuate said first driven member in the opposite direction, and lost motion drive means interconnecting said drive shaft and said second driven member and providing a predetermined dwell on each reversal of rotation of said drive shaft, said apparatus further comprising control means for said reversible power means for oscillating said drive shaft between limit positions.

17. In balling apparatus as defined in claim 16 wherein said cam means comprises a cam drum having a helical track thereon for actuating said first driven member and an annular track providing the dwell for said first driven member.

18. In a doffing apparatus as defined in claim 16 and further comprising a ball-delivery drum disposed to receive a ball from said arbors, means supporting said ball-delivery drum for rotation between a receiving and a discharging position and means operated by said first driven member to oscillate said ball-delivery drum between its said positions on reciprocation of said first driven member.

19. In a balling apparatus for forming a strand or sliver of material into a ball, an arbor upon which the strand is wound to form a ball, a driving drum cooperating with said arbor to rotate the latter and engageable with the periphery of said arbor or the ball thereon to effect a rotation of the arbor, support means for said arbor comprising a support arm rotatably supporting said arbor, a member supporting said support arm for movement in a direction away from said driving drum and about a first axis offset from the axes of said driving drum and arbor to accommodate the build-up of a ball on said arbor, means supporting said member for oscillation about a second axis offset from said first axis and the axes of said drum and arbor to move said arbor between a doffing position and a balling position, a ball-delivery drum disposed to receive a ball from said arbor, means supporting said drum for rotation between a ball-receiving position and a ball-delivery position, and means for simultaneously oscillating said member and ball-receiving drum between balling and ball-delivery positions on one hand and doffing and ball-receiving positions on the other hand.

20. In a balling apparatus for forming a sliver of material into a ball, an arbor upon which the sliver is wound to form a ball, a driving drum cooperating with said arbor to rotate the latter and engageable with the periphery of said arbor or the ball thereon to effect a rotation of the arbor, support means for said arbor comprising a support arm rotatably supporting said arbor, a member supporting said support arm for movement away from said driving drum about a first axis offset from the axis of said driving drum and said arbor to accommodate the build-up of a ball thereon, means supporting said member for oscillation about a second axis offset from said first axis to move said arbor between a ball-doffing position and a ball-forming position, reversible power-actuated means operatively connected to said member for oscillating said member to move said arbor between balling and ball doffing positions, means responsive to a condition indicative of the forming of a ball on said arbor of predetermined size for initiating operation of said reversible power-actuated means in one direction to move said arbor to a ball-doffing position and responsive to a condition indicative of the doffing of the ball from the arbor to reverse said power-actuated means and operate the latter in its opposite direction to return said arbor to a balling position, a ball delivery drum disposed to receive a ball from said arbor, means supporting said drum for oscillation between ball-receiving and ball-delivery positions, and means operatively connecting said reversible power-actuated means to said ball-delivery drum to oscillate the latter with said member.

21. In a balling apparatus, an arbor upon which a sliver is wound to form a ball, a support for said arbor, means mounting said support for movement to move said arbor between a balling and a doffing position, a drive for effecting movement of said support including a member reciprocable to reciprocate said support between its said positions and means operatively connecting said support and said member for driving the support from said member, a balling drum disposed to receive a formed ball from said arbor means supporting said drum for rotation between a ball receiving position and a ball delivery position, and means operatively connecting said member to reciprocate said drum upon reciprocation of said member.

22. In a balling apparatus, arbor means upon which a sliver is wound to form a ball, the sliver for each ball being started at a predetermined point on said arbor means, a guide member reciprocable along the length of said arbor means for guiding said sliver on to said arbor means, said guide member having a predetermined position opposite to said predetermined point where it is to be positioned at the start of each new ball, sensing means for sensing displacement of said guide member from said predetermined position and power actuated means for reciprocating said guide member including drive means selectively actuatable in response to said sensing means to return said guide member to said predetermined position when displaced therefrom.

23. In a balling apparatus as defined in claim 22 wherein said sensing means comprises a control member repeatedly moved along a predetermined path in timed relationship to the movement of said guide member, said control member having a unique position corresponding to said predetermined position of said guide member, and means for sensing the displacement of said control member from its said unique position and controlling said drive means.

24. In a balling apparatus as defined in claim 22 wherein said arbor means is comprised of a pair of aligned half arbors the adjacent ends of said half arbors being disposed against each other to grip the sliver therebetween and said half arbors being supported for relative axial movement toward and from each other, said predetermined position of said guide member being opposite the engaged ends of said half arbors when gripping said sliver.

25. In a ball apparatus for forming a sliver of material into a ball, an arbor upon which the sliver is wound to form a ball, a driving drum cooperating with said arbor to rotate the latter and engageable with the periphery of said arbor or the ball thereon to effect a rotation of the arbor, support means for said arbor comprising a support arm rotatably supporting said arbor, a member supporting said support arm for movement away from said driving drum about a first axis offset from the axis of said driving drum and said arbor to accommodate the build-up of a ball thereon, means supporting said member for oscillation about a second axis offset from said first axis to move said arbor between a ball-doffing position and a ball-forming position, reversible power-actuated means operatively connected to said member for oscillating said member to move said arbor between said balling and ball-doffing positions, means responsive to a condition indicative of the forming of a ball of a predetermined size on said arbor for initiating operation of said reversible power-actuated means in one direction to move said arbor to a ball-doffing position and responsive to a condition indicative of the doffing of the ball from the arbor to reverse said power-actuated means and operate the latter in its opposite direction to return said arbor to a balling position, a guide member reciprocable along the length of said arbor to guide the sliver into the arbor, said guide member having a predetermined position where it is to be positioned at the start of each new ball, drive means actuatable to connect said power-actuated means to drive said guide member, sensing means actuatable to sense the displacement of said guide member from said predetermined position and to actuate said drive means when said guide member is so displaced, and means for actuating said sensing means.

26. In a balling apparatus, an arbor comprising a pair of aligned half arbors disposed in end-to-end relationship and upon which a sliver is wound to form a ball, a respective support arm journally supporting each of said half arbors at the outer end thereof, a driving drum engageable with the outer periphery of said half arbors or the ball thereon to effect a rotation of the half arbors and a winding of the sliver, first and second support members, first means pivoting said arms to a respective one of said members for free pivotal movement about a common axis to accommodate build-up of a ball on said arbors, second means supporting said members for relative movement toward and away from each other and for selective movement about a second axis parallel to said common axis but offset therefrom to move said arms between a ball-doffing position and a balling position, actuating means operatively connected to said members and operable in a forward direction to move said members in one direction about said second axis and away from each other to doff a ball and operable in a reverse direction for moving said members toward each other and in their other direction about said axis to return said members to a balling position, a guide member reciprocable the length of said arbor to guide the sliver onto the arbor, said sliver being gripped between the adjacent ends of said half arbors at the start of each ball and said guide member having a predetermined position opposite the point the sliver is gripped and to which it is to be positioned preparatory to the starting of each new ball, drive means actuatable to connect said power-actuated means to drive said guide member, sensing means actuatable to sense the displacement of said guide member from said predetermined position and to actuate said drive means when said guide member is so displaced, and means for actuating said sensing means.

27. In a balling apparatus, arbor means upon which a sliver is wound to form a ball, a guide member reciprocable along the length of said arbor means to guide the sliver onto said arbor means, said guide member having a predetermined position to which it is returned preparatory to the starting of each new ball, a drive member rotatable in one direction to reciprocate said member, power actuated means, a drive connecting said power actuated means to drive said drive member in said one direction and comprising overrunning clutch means enabling said drive member to be rotated ahead of said drive in said one direction, second power actuated means, sensing means actuatable to sense the displacement of said guide member from its said predetermined position and to connect said power actuated means to drive said drive member in its said one direction if said guide member is displaced from its said predetermined position, and means for actuating the last-recited means to position said guide member in its said predetermined position preparatory to the starting of each new ball.

28. In a balling apparatus as defined in claim 27 wherein said arbor means comprise a pair of aligned half arbors disposable in abutted end-to-end relationship to form an arbor and to grip the sliver between the abutted ends, support means supporting said half arbors for relative axial movement to open and close the half arbors to doff a formed ball and again grip the sliver; drive means operatively connecting said second power actuated means to said half arbors to effect said opening and closing, and means for actuating said second power actuated means when a formed ball is to be doffed and the sliver again gripped.

29. In a balling apparatus, an arbor upon which a sliver is wound to form a ball, said arbor having a balling position and being operable to effect the doffing of a ball, a guide member reciprocable along the length of the arbor to guide the sliver onto the arbor, said guide member having a predetermined position to which it is to be returned preparatory to the start of each new ball, power means for supplying sliver to said guide member and arbor including a power actuated drive for operating said means and connected to effect reciprocation of said guide member, a second power actuated drive, means connecting said second power actuated drive to said arbor to effect a doffing of a ball and the return of said arbor to balling position, additional means actuated to connect said second power actuatable drive to reciprocate said guide member, control means for energizing and de-energizing said power-actuated drives, and sensing means actuatable to sense the displacement of said guide member from said predetermined position and to actuate said additional drive means if said guide member is displaced when said sensing means is actuated, and means for actuating said sensing means.

References Cited in the file of this patent or the original patent

UNITED STATES PATENTS 2,292,725 Treckman _____ Aug. 11, 1942